United States Patent
Kawaguchi et al.

[11] Patent Number: 6,163,341
[45] Date of Patent: *Dec. 19, 2000

[54] PORTABLE VIDEO CAMERA WITH ADJUSTABLE MOTOR DRIVING SIGNALS FOR OPTIMIZING POWER CONSUMPTION

[75] Inventors: Naoki Kawaguchi, Kanagawa; Yoshikazu Ohchi, Chiba, both of Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/619,178

[22] Filed: Mar. 21, 1996

[30] Foreign Application Priority Data

Mar. 27, 1995 [JP] Japan .................................. 7-093036

[51] Int. Cl.$^7$ .................................................. G03B 13/00
[52] U.S. Cl. .......................................... 348/357; 348/358
[58] Field of Search .................................. 348/372, 357, 348/358, 335, 347; 318/685, 696, 430

[56] References Cited

U.S. PATENT DOCUMENTS

| | | | |
|---|---|---|---|
| 4,833,372 | 5/1989 | Kobayashi | 318/696 |
| 4,851,755 | 7/1989 | Fincher | 318/696 |
| 4,991,944 | 2/1991 | Hirao et al. | 348/347 |
| 5,148,201 | 9/1992 | Umetsu et al. | 396/86 |
| 5,252,903 | 10/1993 | Maruyama | 318/685 |
| 5,276,318 | 1/1994 | Hirasawa | 250/201.4 |
| 5,287,223 | 2/1994 | Hirasawa | 348/345 |
| 5,298,933 | 3/1994 | Chigira | 354/400 |
| 5,418,443 | 5/1995 | Kikuchi | 318/685 |
| 5,434,621 | 7/1995 | Yu | 348/347 |
| 5,436,684 | 7/1995 | Hirasawa | 348/347 |
| 5,444,240 | 8/1995 | Nakayama | 250/237 |
| 5,530,332 | 6/1996 | Rees | 318/685 |
| 5,701,157 | 12/1997 | Kato et al. | 348/358 |

FOREIGN PATENT DOCUMENTS

| | | | |
|---|---|---|---|
| 0571289 | 11/1993 | European Pat. Off. | H02P 7/00 |
| 3265496 | 11/1991 | Japan | H02P 8/00 |
| 5281459 | 10/1993 | Japan | G02B 7/28 |

*Primary Examiner*—Wendy Garber
*Assistant Examiner*—Aung S. Moe
*Attorney, Agent, or Firm*—Jay H. Maioli

[57] ABSTRACT

A portable video camera with adjustable motor driving signals for optimizing power consumption including a zoom lens and a focusing lens driven by stepping motors, a drive signal generating circuit for generating drive signals to the stepping motors, an external input device for receiving an external motor driving speed and motor direction input from a user, a control circuit for estimating drive loads to the stepping motors based on the external motor driving speed and motor direction input from the user and for producing an amplitude control signal corresponding to the external input, and a circuit for controlling an amplitude of the drive signals based on the amplitude control signal produced by the control circuit for estimating drive loads and for feeding the amplitude of the drive signals to the drive signal generating circuit.

2 Claims, 7 Drawing Sheets

PORTABLE VIDEO CAMERA WITH ADJUSTABLE MOTOR DRIVING SIGNALS FOR OPTIMIZING POWER CONSUMPTION

BACKGROUND OF THE INVENTION

1. Field of the Invention

This invention relates to a portable video camera using stepping motors in automatic focusing and zooming mechanisms.

2. Description of the Related Art

Many portable video cameras, in particular small-scaled ones for home use, include built-in automatic focusing mechanism and zooming mechanism for easier video camera work. Automatic focusing and zooming mechanisms include lens drive means, and they are generally driven by stepping motors.

Stepping motors, in general, are essentially driven by a rectangular wave. However, stepping motors driven by a rectangular wave, in operation, generate noise caused by vibrations or higher harmonics. Therefore, most of stepping motors incorporated into video cameras are driven by a sine wave.

Driving by a sine wave is effected on the basis of data preliminarily stored in ROM without actually generating a sine wave. The ROM stores data indicating duty ratios of rectangular waves corresponding to sine waves taken by sampling at appropriate intervals. For example, the duty ratio is determined as 50% at angle 0 (rad), 100% at $\pi/2$, 0% at $3\pi/2$, et seq. The stepping motor is driven by a rectangular wave generated on the basis of the data. At this time, the rectangular wave is smoothed into a sine wave by a bridge circuit for driving the stepping motor or by the coil of the motor itself.

Data stored in ROM corresponds to a sine wave. Therefore, the ROM need not store data of the full cycle from 0 to $2\pi$, but may store, for example, data of only ¼ cycle from 0 to $\pi/2$. When the stepping motor is driven, during 0 to $\pi/2$, data read out from ROM is used directly, and during $\pi/2$ to $\pi$, data stored in ROM is read out in the opposite sequence from that for 0 to $\pi/2$. During $\pi$ to $3\pi/2$, data of 0 to $\pi/2$ stored in ROM is read out in the normal sequence but inverted in sign. During $3\pi/2$ to $2\pi$, data for 0 to $\pi/2$ is read out in the opposite sequence and assigned with the opposite sign. In this manner, by changing the order of reading data and/or changing the sign, where necessary, data of the full cycle from 0 to $2\pi$ can be produced from data of 0 to $\pi/2$ alone.

When a stepping motor is driven by a sine wave, the cycle of the sine wave is modified to change the driving speed of the motor into a value for high-speed driving, low-speed driving, or the like. FIG. 7 shows sine waves of different cycles for different driving speeds. As illustrated, the cycle is short for high-speed driving and long for low-speed driving. The amplitude of the sine wave is constant regardless of the speed.

FIG. 8 shows a conventional circuit arrangement for driving a stepping motor. The stepping motor used here is of a PM (permanent magnet) type 2-phase-excited bipolar driving which is generally used for driving lenses of video cameras, floppy disk driving systems, and so forth.

MCU 100 supplies a read clock signal and an UP/DOWN signal to an address counter 101. Based on these signals, address data for reading out sine wave data from ROM 102 is supplied from the address counter 101 to ROM 102.

The read clock determines the frequency of the sine wave data read out from ROM 102. Therefore, if the intervals of the read clock are short, then the frequency of the sine wave is high, and the stepping motor is driven at a high speed. Similarly, if the intervals of the read clock are long, the stepping motor is driven at a low speed. The UP/DOWN signal inverts the sign of the sine wave data read out from ROM 102 from plus to minus, or vice versa, and the stepping motor is driven in the opposite direction.

ROM 102 also stores data on duty ratios of rectangular waves corresponding to sine waves of ¼ cycle, i.e. from 0 to $\pi/2$. Therefore, when data is read out from ROM 102, the address counter 101 controls the order for reading out data in a predetermined cyclic range and adds the positive or negative sign to the data as explained above, thereby generates and outputs data for the full cycle from 0 to $2\pi$.

Data on the duty ratios of rectangular waves corresponding to the sine waves is supplied to PWM generating circuits 103 and 104. The stepping motor to be driven here is of a 2-phase excitation type as stated above. Therefore, sine waves different in phase by $\pi/2$ are supplied simultaneously to the motor. Generation of waves in different phases can be realized by changing the way of reading data from ROM 102.

A rectangular-wave output from the PWM generating circuit 103 is supplied to the coil 107a of the stepping motor 107 via an H bridge circuit 105 for driving the stepping motor 107. A rectangular-wave output from the PWM generating circuit 104 is supplied to the coil 107b of the stepping motor 107 via an H bridge circuit 106. These rectangular-wave outputs are smoothed into sine waves (or cosine waves) by the H bridge circuit 105 and the coil 107a, or the H bridge circuit 106 and the coil 107b. Thus, driving of the stepping motor 107 by sinusoidal waves is realized.

FIG. 9 is a vector representation of the sine wave supplied to the stepping motor 107 driven in the above process. In the figure, arrows labelled phase A and phase B correspond to respective excitation vectors of two coils 107a and 107b. When sine and cosine waves are supplied to phase A and phase B, their composite vector draws a circle of a given diameter as illustrated.

In a video camera using such stepping motors, driving directions of the stepping motors are frequently changed for fine adjustment of focalization, or the like, during automatic focalization. Also during zooming function, rotating directions are frequently changed from one direction to the other. Moreover, if the camera includes the function of changing the zooming speed, a change in zooming speed causes a change in motor driving speed.

A large load is applied to a stepping motor under various conditions such as changes in driving direction, high-speed driving, starting of the motor, or low temperature, and if these conditions overlap, then the load to the stepping motor will become much larger. If, nevertheless, the driving voltage supplied to the stepping motor is not sufficiently large, then the motor cannot obtain a required torque, and produces a so-called power swing.

In a conventional system using a stepping motor of this type, the driving voltage (or driving current) for driving the stepping motor is set to a value with which a torque large enough to prevent power swing can be obtained even when a maximum load is applied to the stepping motor, among others, used in the system. Then, the same drive voltage (or drive current) is supplied also under a small load. The torque necessary for the motor driven under a small load may be smaller than that under the maximum load. Therefore, the conventional system fails to optimize the driving efficiency.

If a stepping motor of this type is used in a portable video camera normally relying upon a battery to be charged from time to time, useless consumption of battery power is a great disadvantage.

OBJECTS AND SUMMARY OF THE INVENTION

It is therefore an object of the invention to provide a portable video camera using stepping motors, in which the load to each motor is estimated and an appropriate driving voltage (or driving current) corresponding to the estimated load is supplied to the motor, in order to save power consumption by the stepping motors and to alleviate consumption of the battery.

To solve the above problem, the invention lies in a portable video camera using stepping motors for driving a zoom lens and a focusing lens, including: drive signal generating means for generating drive signals to the stepping motors; and circuitry responsive to the drive signals for estimating loads to the stepping motors and for controlling drive voltages or drive currents in accordance with the estimated loads.

To solve the above problem, the invention also lies in a portable video camera in which each stepping motor is of a type which uses a sine wave as its drive signal (voltage or current) and in which data on sine waves with different amplitudes are stored in memory so as to control the drive voltage (or drive current) by the data on selected one of the sine waves.

To solve the above problem, the invention also lies in a portable video camera according in which each stepping motor is of a type using a sine wave as its drive signal (voltage or current) and in which data on a sine wave is stored in memory so as to control the drive voltage (or drive current) by controlling the data on the sine wave by amplitude control means.

With the above constructions, since the stepping motor used in the auto-focusing mechanism and the stepping motor used in the zooming mechanism are driven in appropriate conditions variable with loads to the motors, power consumption by these motors can be reduced.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

An embodiment of the invention is described below with reference to the drawings. This invention is essentially directed to optimization of the driving voltage (or driving current) supplied to stepping motors by estimating loads applied to the motors.

Figure 1:
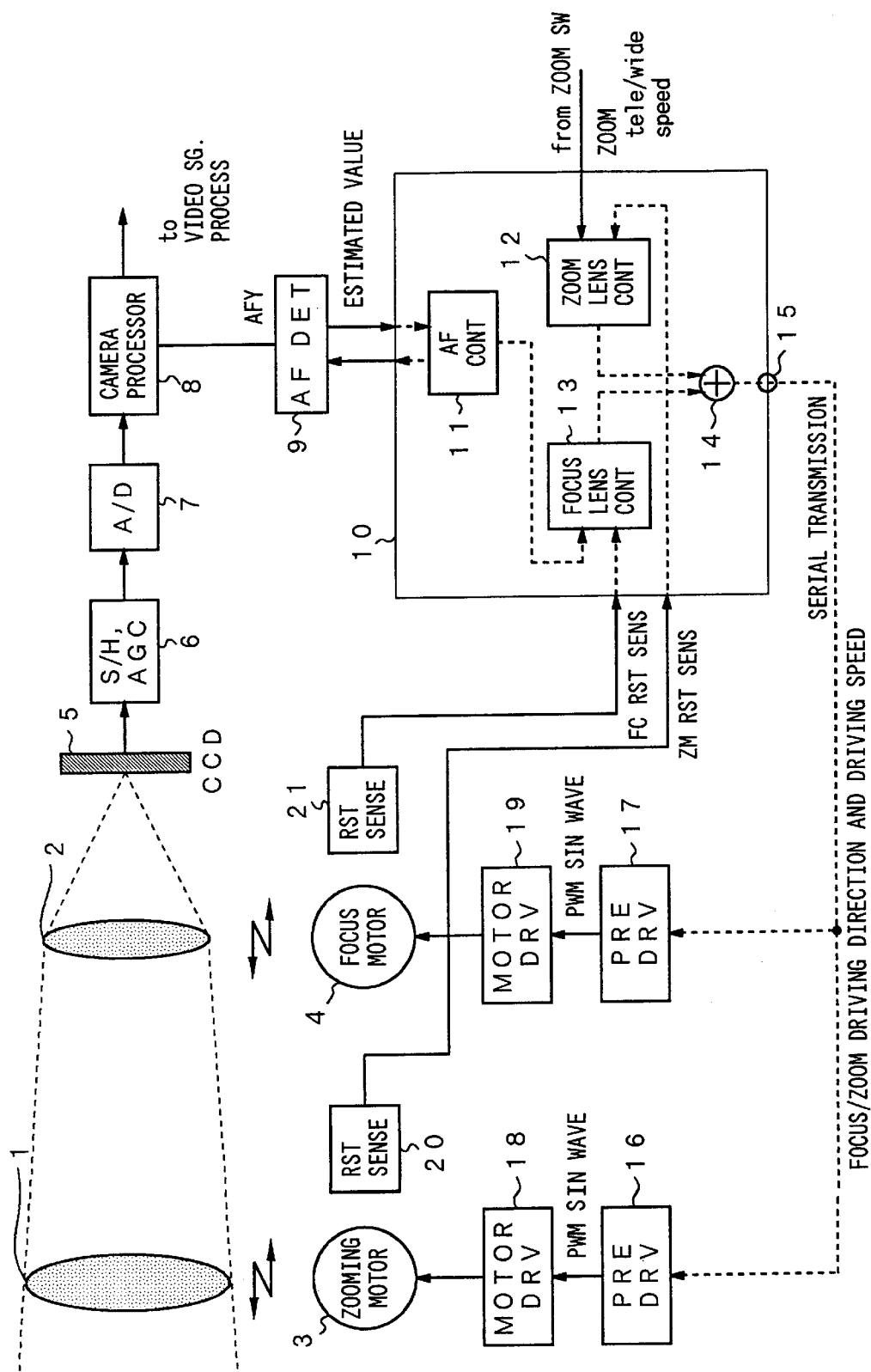
FIG. 1 is a block diagram showing an arrangement of a video camera to which the invention can be applied.

FIG. 1 shows a general aspect of a video camera to which the invention can be applied. Numeral 1 denotes a zoom lens, and numeral 2 a focusing lens. The zoom lens 1 is driven by a stepping motor used as a zooming motor 3. The focusing lens 2 is driven by a focusing motor 4. The zoom lens 1 is moved forward or backward along an optical axis by the zooming motor 3 to change the size of an image. The focusing lens 2 is moved forward or backward along the optical axis by the focusing motor 4 to establish focalization onto a desired image. Standard positions of the zoom lens 1 and the focusing lens 2 are detected by reset sensors 20 and 21, respectively, and a respective one of outputs from the reset sensors 20 and 21 are supplied to a zoom lens control circuit 12 and a focusing lens control circuit 13 which will be described later.

In this example, the stepping motors used as the zooming motor 3 and the focusing motor 4 are of a PM-type 2-phase excitation bipolar driving type.

An image from an object enters into CCD 5, used as a receptor element, through the zoom lens 1 and the focusing lens 2. Output signal from CCD 5 is supplied to S/H (sample-hold) AGC (automatic gain control) circuit 6 for extraction of a video signal and adjustment of the signal level. Output signal from the S/H AGC circuit 6 is converted into a digital signal in an A/D converter 7, and then supplied to a camera processor 8. The video signal supplied to the camera processor 8 is subjected to predetermined signal processing, and then sent to a video signal processor (not shown) provided at a later stage.

The camera processor 8 supplies a luminance signal (AFY signal) for automatic focalization to an auto-focusing detecting circuit 9. The auto-focusing detector 9 refers to the supplied AFY signal to determine whether focalization is established or not. The result of the determination is supplied as an estimated value to an auto-focusing control circuit 11 in MCU 10.

MCU 10 is a control circuit for controlling the entire system of the video camera, and contains a zoom lens control circuit 12 and a focusing lens control circuit 13 in addition to the auto-focusing control circuit 11.

The auto-focusing control circuit 11 evaluates the value of an output from the auto-focusing detecting circuit 9 and supplies the result of the evaluation to the focusing lens control circuit 13. The focusing lens control circuit 13 uses the evaluated value supplied from the circuit 11 to calculate, among others, how much the focusing lens 2 should be moved to establish focalization by driving the focusing motor 4, and supplies a control signal for controlling the motor in response to the required amount of movement and speed. The control signal is supplied as a focusing motor control signal to an adder 14.

The zoom lens control circuit 12 is supplied with a zooming command through buttons or other like on the video camera, for example, to instruct whether the object should be zoomed up or not, or at what speed the zoom lens should be driven. Then a motor control signal responsive to the zooming command is output to move the zooming motor 3 according to a required amount of movement of the zoom lens, a required zooming speed, or a required zooming direction. The control signal is supplied to an adder 14 to serve as a zooming motor control signal.

In the adder 14, the focusing motor control signal and the zooming motor control signal are superposed at a predetermined timing and supplied to a serial transmission port 15. The supplied signal is sent to a pre-driver 16 for the zooming motor 3 and to a pre-driver 17 for the focusing motor 4. In each of these pre-drivers 16 and 17, the signal superposed in the serial signal at the predetermined timing for driving the associated motor is extracted. That is, the zooming motor control signal for driving the zooming motor 3 is extracted in the pre-driver 15, and the focusing motor control signal for driving the focusing motor 4 is extracted in the pre-driver 16.

The zooming motor 3 and the focusing motor 4 are driven by sine waves. Rectangular waves having duty ratios corresponding to sine waves to be used for driving the motors 3 and 4 are generated in the pre-drivers 16 and 17. By that time, the pre-drivers 16 and 17 are also supplied with the motor control signals responsive to the driving conditions as explained above. Then, the pre-drivers 16 and 17 make the rectangular waves to correspond to the control signals so as to drive the motors 3 and 4 efficiently.

As explained above, the load applied to each stepping motor varies with driving conditions. Examples of relative magnitudes of the load are: low-speed driving<high-speed driving during driving in one direction<upon changing the direction during driving in one direction<upon starting the motor hot environment<cool environment where the symbol<indicates the relation in magnitude between two operations or states.

Figure 2:
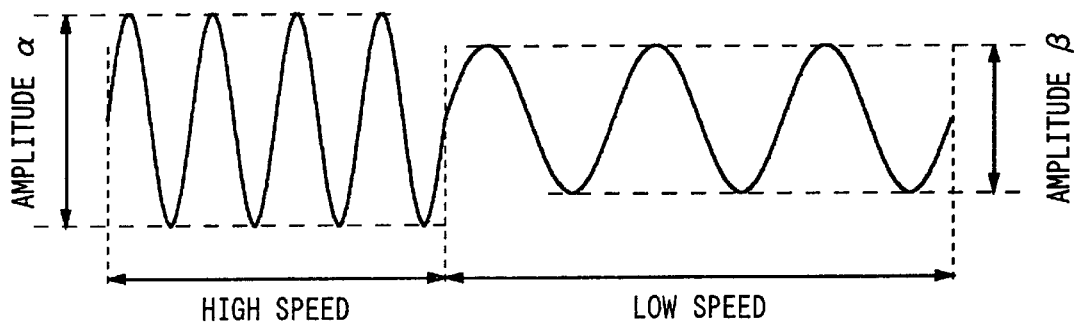
FIG. 2 is a diagram showing an example of sine waves corresponding to rectangular waves for driving motors efficiently.

FIG. 2 shows sine waves corresponding to rectangular waves for driving the motors efficiently. This figure comparatively shows a sine wave for driving the motor at a low speed and a sine wave for driving the motor at a high speed. The sine wave for low-speed driving has a smaller amplitude β than the amplitude α of the sine wave for high-speed driving, as expressed by α>β. That is, when the motor is driven at a low speed, the driving voltage, or amplitude is supplied with a value lower than that for driving the motor at a high speed. As a result, improvement in the motor driving efficiency is realized by supplying an appropriate driving voltage corresponding to the rotating speed. Assuming that low-speed driving is possible with 70% of the driving voltage required for high-speed driving, since the loss is proportional to the square of the voltage, taking the d.c. resistance of the coil alone into consideration, reduction of 51% in power consumption is realized.

In this manner, rectangular waves corresponding to the sine waves having amplitudes responsive to the loads varying with the operative conditions are supplied from the pre-drivers 16 and 17 to motor drivers 18 and 19. The motor drivers 18 and 19 comprise, among others, a bridge circuit for driving the stepping motor. Thus, the motor driver 18 drives the zooming motor 3, and the motor driver 19 drives the focusing motor 4. The rectangular waves supplied to the motor drivers 18 and 19 are smoothed into sine waves by the motor drivers 18, 19 and by coil circuits of the motors 3, 4.

Figure 3:
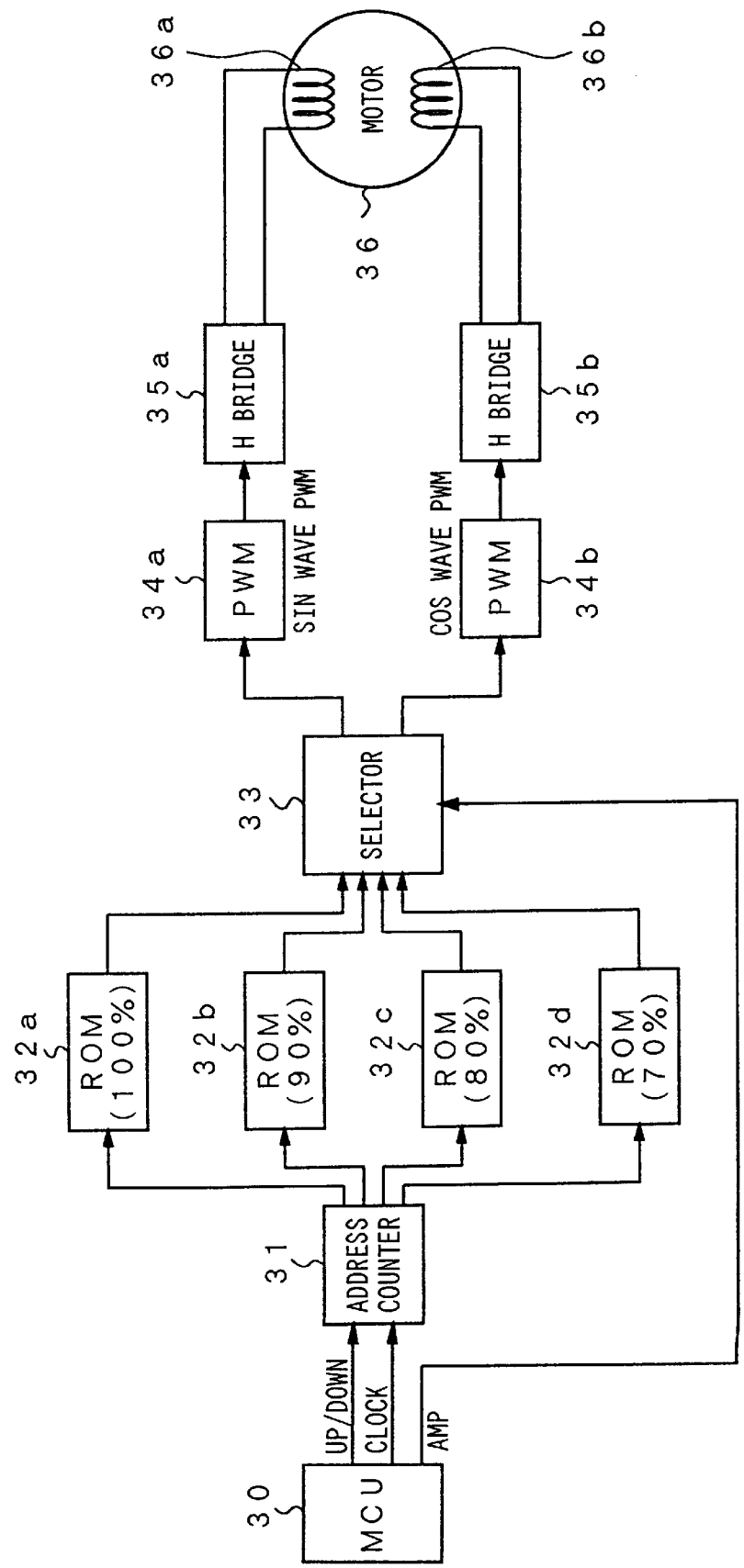
FIG. 3 is a diagram showing a more detailed arrangement of a control circuit for a stepping motor in the same embodiment.

FIG. 3 shows the arrangement of the control circuit for controlling the stepping motor used in this embodiment in greater detail. MCU 30 is coupled to an address counter 31. MCU 30 is also coupled to a selector 33. The address counter 31 is coupled to all of ROMs 32a, 32b, 32c and 32d, and ROMs 32a, 32b, 32c and 32d are coupled to a selector 33. The selector 33 is connected to both PWM generating circuits 34a and 34b. The PWM generating circuit 34a is coupled to a H bridge 35a connected to a coil 36a of a motor 36. The PWM generating circuit 34b is coupled to a H bridge 35b connected to a coil 36b of the motor 36. The motor 36 corresponds to the zooming motor 3 or focusing motor 4 explained above with reference to FIG. 1.

Stored in ROMS 32a to 32d are data for one quarter of sine/cosine waves, i.e. data for the cycle from 0 to π/2. The data stored in ROMs 32a, 32b, 32c and 32d are sine/cosine waves different in amplitude. In this example, ROM 32a stores data of sine/cosine waves with the amplitude of 100%. ROM 32b stores data whose amplitude is 90% of the data stored in ROM 32a, ROM 32c stores data whose amplitude is 80%, and ROM 32d stores data of sine/cosine waves whose amplitude is 70%. In this connection, the stored contents are not to store data of sine/cosine waves with amplitudes of 60%, 50%, et seq.

Respective data are read out from ROM 32a to 32d in response to read addresses from the address counter 31. The address counter 31 is controlled by an UP/DOWN signal and a read clock signal from MCU 30. As stated above, these ROMs 32a to 32d store data of duty ratios of rectangular waves corresponding to sine waves in the range of a quarter cycle. Therefore, when data is read out from ROMs 32a to 32d, the address counter 31 controls the order of reading data in the predetermined cyclic range and adds the positive or negative sign to generate and output data of one full cycle, that is, 0 to 2π. Outputs from ROMs 32a to 32d are supplied to the selector 33 which is controlled by an AMP signal from MCU 30.

Externally supplied to MCU 30 are signals indicating driving conditions for driving the motor 36. The signals include a user's entry signal for changing the zooming speed, a signal for adjusting focalization, sent from the auto-focusing control circuit, or the like. The driving conditions here include, for example, the driving speed, inversion of the direction, reduction of the speed, and data on the temperature of the motor 36 and its environment, sent from a temperature sensor (not shown). MCU 30, in receipt of these signals, supplies a read clock signal for determining the driving speed and an UP/DOWN signal for inverting the direction to the address counter 31. The address counter 31, supplied with the clock read signal and the UP/DOWN signal, reads out the rectangular wave data corresponding to the sine/cosine waves stored in ROMs 32a to 32d and sends it to the selector 33.

Figure 4:
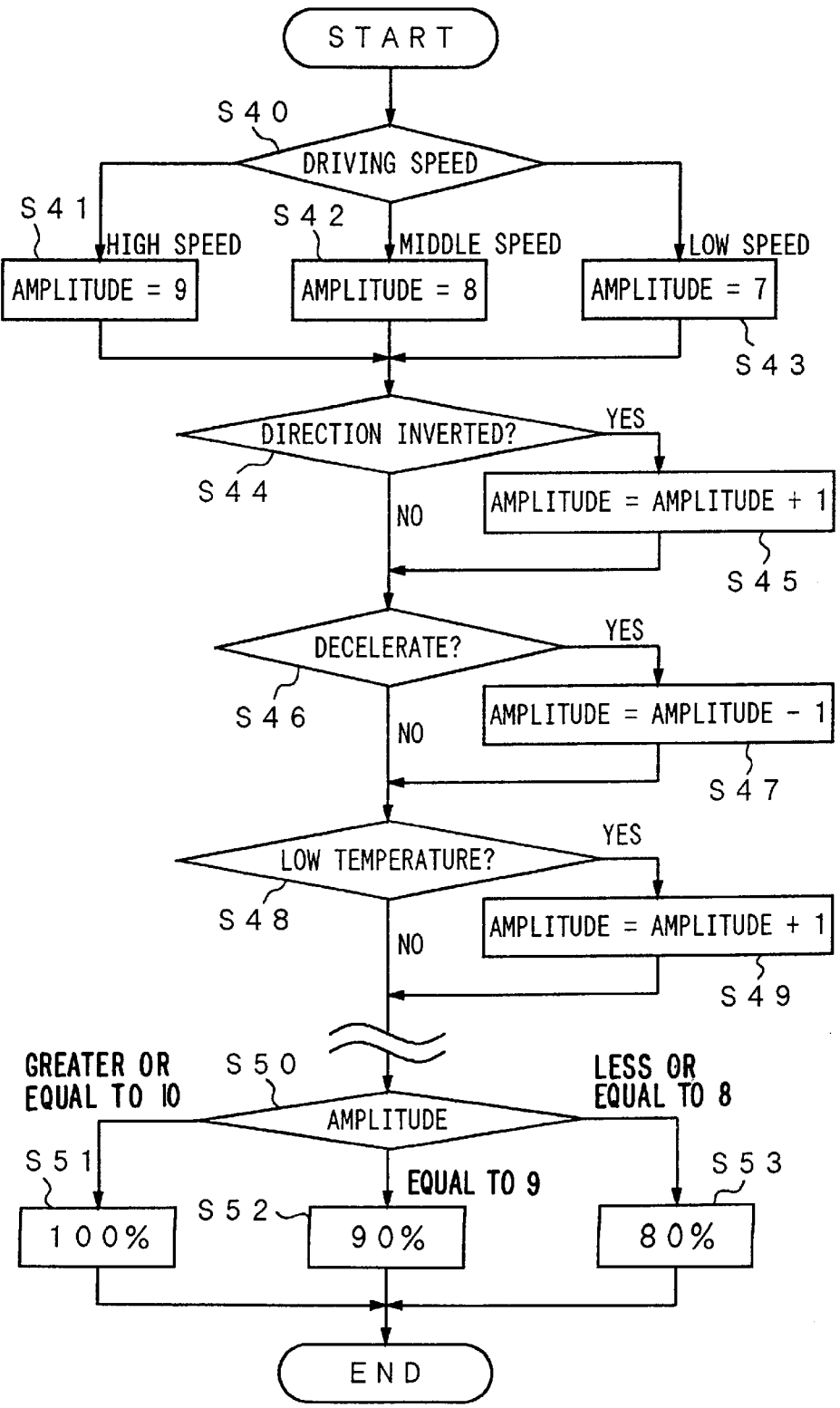
FIG. 4 is a flow chart showing a process for determining an amplitude for driving the motors efficiently.

Simultaneously, MCU 30 determines an amplitude for efficiently driving the motor 36. FIG. 4 is a flow chart of a process for this operation. First, at step S40, the speed for driving the motor 36 is determined. If the motor 36 is to drive the zoom lens, a user of the camera selects, for example, one of high, middle and low zooming speeds, and enters his instruction through an external button or the like.

The external input is sent to MCU 30, and MCU 30 determines an appropriate amplitude for sine/cosine waves for driving the motor 36 most efficiently with respect to the instructed driving speed. If the zoom lens is to be driven at a high speed, the process proceeds to step S41 where the amplitude is set to 9. If the zoom lens is to be driven at a middle speed, the process proceeds to step S42 where the amplitude is set to 8. If the zoom lens is to be driven at a low speed, the process proceeds to step S43 where the amplitude is set to 7. After an appropriate amplitude for the sine/cosine waves is chosen in step S41, S42 or S43 in response to the instructed driving speed, the process goes to step S44.

In step S44, it is determined from the signal supplied to MCU 30 whether the direction should be inverted or not. If not, the process goes directly to step S46. If the direction is to be inverted, since the load to the motor 36 increases, the process goes to step S45 where a new amplitude is determined by adding 1 to the amplitude determined in step S41, S42 or S43. Then the process proceeds to step S46.

In step S46, it is determined from the signal supplied to MCU 30 whether the driving speed should be reduced or not. If not, the process goes directly to step S48. If the speed should be reduced, since the load to the motor 36 decreases, the process goes to step S47 where a new amplitude is determined by subtracting 1 from the amplitude obtained in step S44. Then, the process goes to step S48.

In step S48, it is determined from the signal supplied from the temperature sensor (not shown) to MCU 30 whether the temperature of the motor 36 or its environment is higher or lower than a predetermined value. If the temperature is higher, the process goes directly to step S50. If the temperature is lower, since the load to the motor 36 increases, the process goes to step S49 where a new amplitude is determined by adding 1 to the amplitude obtained in step S46. Then, the flow goes to step S50.

In step S50. it is determined which sine/cosine waves should be applied to the value indicating the amplitude obtained by step S49. In this example, if the amplitude is equal to or larger than 10, then the process goes to step S51 where sine/cosine waves with the amplitude of 100% is selected. If the amplitude equal 9, then the flow goes to step S52 where sine/cosine waves with the amplitude of 90% are chosen. If the amplitude is equal to or smaller than 8, then the flow goes to step S53 where a value indicating sine/cosine waves with the amplitude of 80% is selected. In this manner, an appropriate amplitude of sine/cosine waves for driving the motor 36 is obtained in accordance with the conditions for driving the motor 36. In this case, several different values defining sine/cosine waves are previously stored in ROMs as explained above. Therefore, these values are quantized.

Selected information on sine/cosine waves is supplied as an AMP signal from MCU 30 to the selector 33. The selector 33 selects one of the signal lines of ROMs 32a to 32d in response to the supplied AMP signal, and supplies selected sine/cosine wave data.

Among data on rectangular waves corresponding to sine/cosine waves selected by and output from the selector 33, data on the sine wave, for example, is supplied to a PWM generating circuit 34a, and data on the cosine wave to a PWM generating circuit 34b.

A rectangular-wave output from the PWM generating circuit 34a is supplied to the coil 36a of the stepping motor 36 via the H bridge circuit 35a for driving the stepping motor 36. A rectangular-wave output from the PWM generating circuit 34b is supplied to the coil 36b of the stepping motor 36 via the H bridge circuit 35b. In this case, the rectangular wave is smoothed into a sine wave; or a cosine wave by the H bridge circuit 35a and the coil 36a, or the H bridge circuit 35b and the coil 35b. As a result, the stepping motor 36 is driven by the sine or cosine wave.

Figure 5:
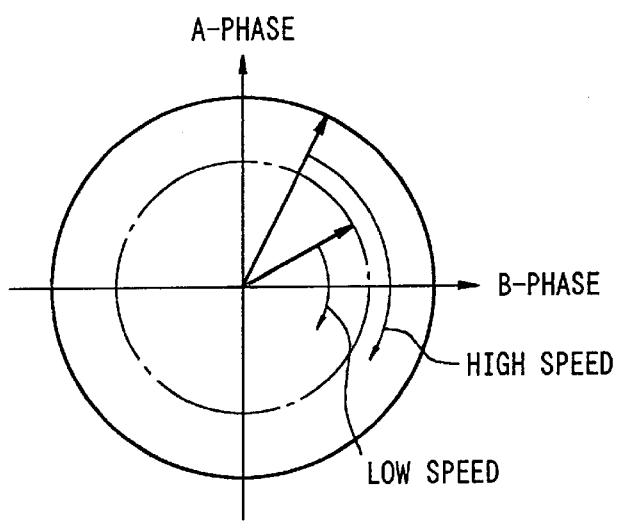
FIG. 5 is a diagram of representation of vectors of a sine wave supplied to a motor for driving the motor efficiently.

FIG. 5 is a diagram of vector representation of a sine wave supplied to the motor 36 driven in the above-described manner. In the figure, arrows labelled with "A-phase" and "B-phase" correspond to vectors of magnetic excitation of two coils of each motor of a two-phase-excitation type. When a sine wave and a cosine wave are supplied to the A-phase and the B-phase, their composite vector draws a small vector orbit at a low speed and a large vector orbit at a high speed as illustrated.

In the flow chart of FIG. 4, four factors, namely, the driving speed, driving direction, reduction in speed and temperature of the motor and its environment, have been explained as conditions for driving the motor. However, the invention is not limited to this example, but may employ additional factors. In such cases, one or more additional steps will be added prior to step S50 in the flow chart. These steps for processing the driving conditions may be in any desired sequence.

Figure 6:
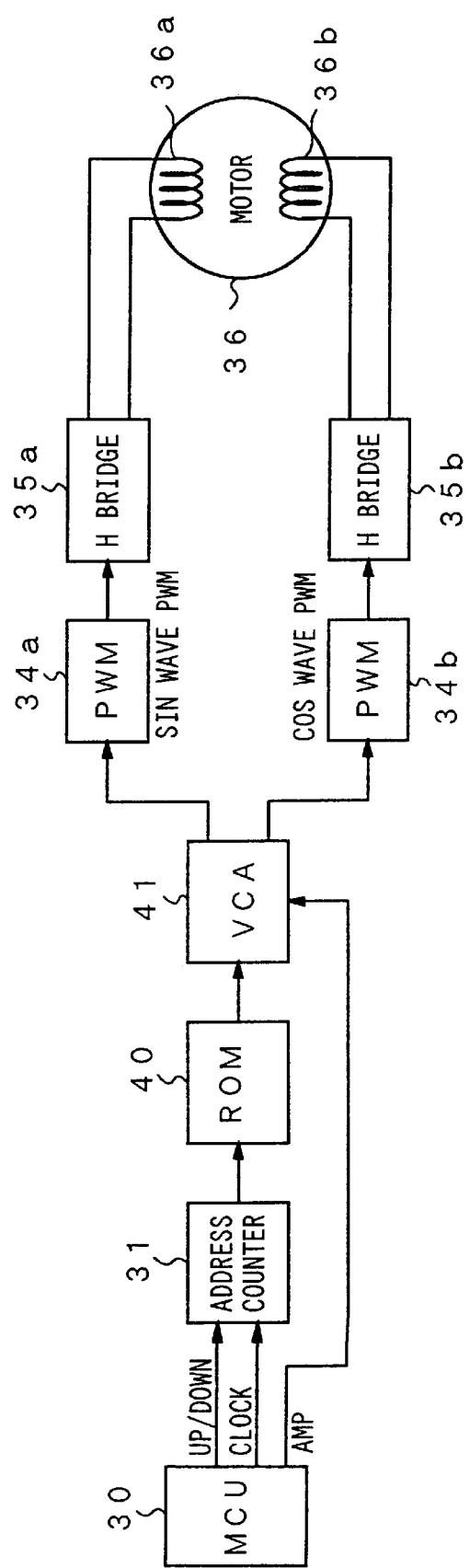
FIG. 6 is a diagram showing a modification of the invention.
Figure 7:
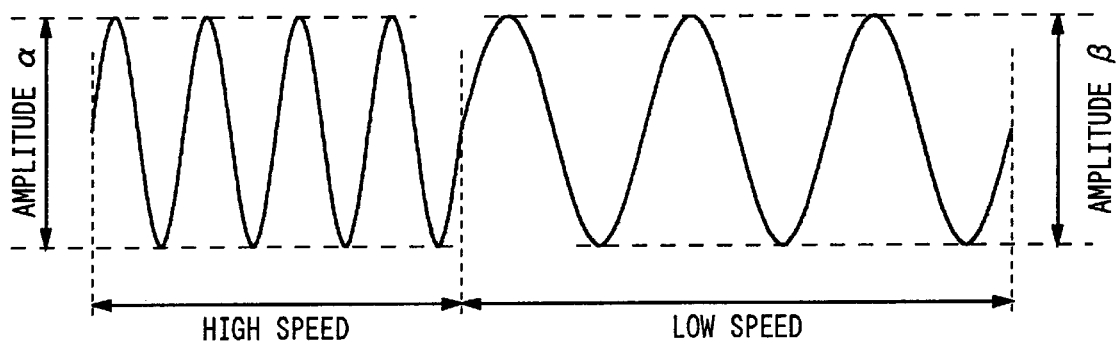
FIG. 7 is a diagram showing sine waves with different frequencies for different driving speeds.
Figure 9:
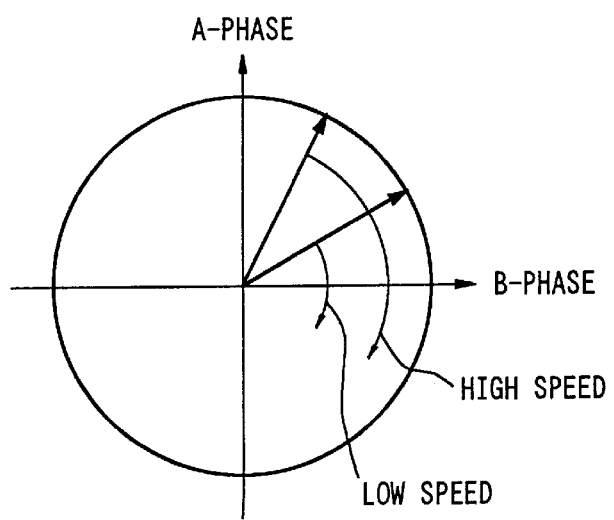
FIG. 9 is a diagram of representation of vectors of a sine wave supplied to a stepping motor by a conventional method.
Figure 8:
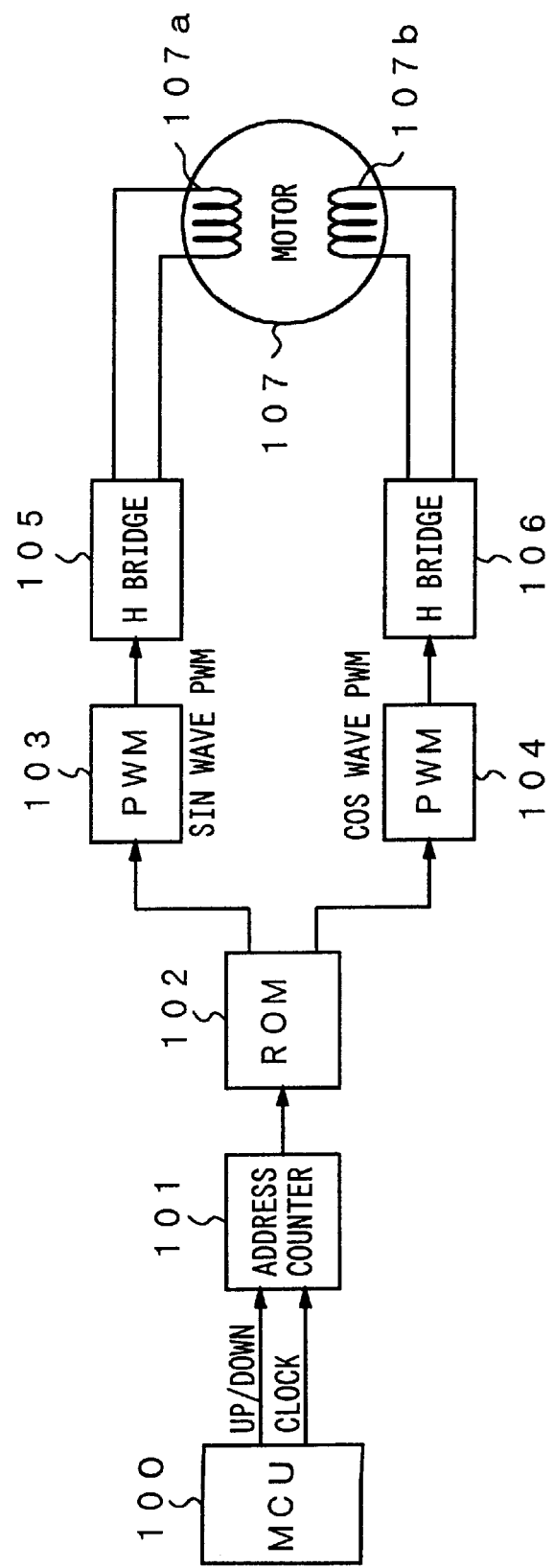
FIG. 8 is a diagram showing an arrangement of a conventional circuit for driving a stepping motor.

FIG. 6 shows a modification of the embodiment described above. In the example of FIG. 3, since data on sine/cosine waves with different amplitudes are stored in ROMs 32a to 32d such that they are output selectively by the selector 33, amplitudes of these waves are discontinuous. In this modification, however, ROM 40 stores data on sine/cosine waves with the amplitude of 100% alone such that an output from ROM 40 is supplied to VCA (voltage-controlled gain-controlling amplifier) 41 controlled by the AMP signal from MCU 30 such that the output is controlled in level.

Externally supplied to MCU 30 is a signal indicating conditions for driving the motor 36. Based on the supplied signal, an UP/DOWN signal for instructing the driving direction and a read clock signal for determining the driving speed are supplied to the address counter 31. Simultaneously, MCU 30 executes the same process as explained with reference to the flow chart of FIG. 4. That is, the value determining the amplitude of the sine/cosine waves is increased or decreased in accordance with the conditions for driving the motor 36. The value determining the amplitude of the sine/cosine waves, which is obtained in this manner, is supplied to VCA 41 as a gain control signal (AMP signal). This is, for example, such that the amplitude of the sine/cosine waves for driving the motor 36 should be 75% of the maximum amplitude.

Data on the rectangular wave of a duty ratio corresponding to the sine/cosine waves preliminarily stored in ROM 40 is read out from MCU 30 by the address counter 31 which is supplied with the UP/DOWN signal and the read clock signal. The data read out here is supplied to VCA 41. Also supplied to VCA 41 is a value indicating the amplitude of the sine/cosine wave (AMP signal). According to this value, predetermined arithmetic operation is executed to the data supplied from ROM 40 to produce rectangular-wave data with a duty ratio corresponding to the sine/cosine waves with the amplitude of 75%, for example, and the data is supplied to the PWM generating circuits 34a and 34b. At this time, among data supplied from ROM 40, sine-wave data, for example, is supplied to the PWM generating circuit 34a, and cosine-wave data is supplied to the PWM generating circuit 34b.

A rectangular-wave output from the PWM generating circuit 34a is supplied to the coil 36a of the stepping motor 36 via the H bridge circuit 35a for driving the stepping motor 36. A rectangular-wave output from the PWM generating circuit 34b is supplied to the coil 36b of the stepping motor 36 via the H bridge circuit 35b. In this case, the rectangular wave is smoothed into a sine wave (or a cosine wave) by the H bridge circuit 35a and the coil 36a, or the H bridge circuit 35b and the coil 36b. As a result, the stepping motor 36 is driven by a sine or cosine wave.

In the examples explained above, the stepping motor is driven by a constant voltage. The invention, however, may employ a constant current by providing a resistor in the H bridge to detect a current flowing in the motor coil and by feeding it back to the PWM generating circuit.

Additionally, the above description has been made on an embodiments in which the stepping motor is driven by micro-step driving and in which the driving speed varies. The invention, however, is not limited to this embodiment. As to the driving waveform, the invention can be realized by using a rectangular wave used for two-phase excitation driving and 1-2-phase excitation driving and by similarly changing the amplitude.

Moreover, as to loaded conditions of the stepping motors, MCU may be designed to judge various factors, not limited to high-speed driving and low-speed driving.

As explained above, according to the invention, stepping motors for driving zoom and focusing lenses of a video camera can be supplied with appropriate drive voltages, or drive currents, responsive to loads to the stepping motors. Therefore, power consumption by the motors can be reduced. As a result, the battery can supply power for a longer time, and the portable video camera can be used for a longer time.

Additionally, since the power consumed by the motors is optimized, generation of heat at the motors can be reduced.

Further, since the motors are driven with minimum energy during low-speed driving, vibrations and noise of the motors can be reduced.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. A portable video camera, comprising:

a zoom lens driven by a first stepping motor receiving a first sinewave;

a focusing lens driven by a second stepping motor receiving a second sinewave;

external input means for receiving a motor driving speed input selected by a user from a plurality of driving speeds and a motor direction input selected by said user;

a temperature sensor for measuring an environmental temperature;

drive signal generating means for generating said first and second sinewaves;

means for estimating optimum drive loads of said first and second stepping motors based on said motor driving speed selected by said user, said motor direction selected by said user, said environmental temperature, and acceleration and deceleration of said motors, and for producing an amplitude control signal corresponding to said estimated drive loads;

an address counter having as inputs read-out clocks and up/down signals produced by said means for estimating drive loads;

a read-only memory for storing data on a drive signal of a constant amplitude only, wherein said constant amplitude drive signal is read out in response to address data supplied from said address counter; and a voltage controlled amplifier fed with said constant amplitude drive signal and being controlled by said amplitude controlled signal so as to output a variable drive signal.

2. The portable video camera according to claim 1, wherein said drive signal generating means further includes:

first and second PWM generating circuits to which said variable amplitude drive signal is supplied; and first and second H bridge circuits connected to said first and second PWM generating circuits, respectively, and to said first and second stepping motors, respectively, for producing and driving said stepping motors with said first and second sinewaves.

* * * * *